(12) United States Patent
Nakao et al.

(10) Patent No.: US 11,551,718 B2
(45) Date of Patent: Jan. 10, 2023

(54) RECORDING AND REPRODUCING DEVICE, RECORDING AND REPRODUCING METHOD, AND MAGNETIC TAPE CARTRIDGE

(71) Applicant: FUJIFILM CORPORATION, Tokyo (JP)

(72) Inventors: Toru Nakao, Kanagawa (JP); Hodaka Suzuki, Kanagawa (JP); Yoichi Akano, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/374,006

(22) Filed: Jul. 13, 2021

(65) Prior Publication Data

US 2021/0343312 A1 Nov. 4, 2021

Related U.S. Application Data

(63) Continuation of application No. 17/022,112, filed on Sep. 16, 2020, now Pat. No. 11,120,832.

(30) Foreign Application Priority Data

Sep. 26, 2019 (JP) .............................. JP2019-175123

(51) Int. Cl.
*G11B 20/12* (2006.01)
*G11B 5/008* (2006.01)

(52) U.S. Cl.
CPC ...... *G11B 20/1201* (2013.01); *G11B 5/00813* (2013.01); *G11B 2020/1278* (2013.01);
(Continued)

(58) Field of Classification Search
CPC ... G11B 5/71927; G11B 5/00813; G11B 7/35; G11B 5/706; G11B 5/584; G11B 5/78;
(Continued)

(56) References Cited

U.S. PATENT DOCUMENTS

| 6,762,900 B2 | 7/2004 | Bui et al. |
| 6,791,781 B2 | 9/2004 | Bui et al. |

(Continued)

FOREIGN PATENT DOCUMENTS

| JP | H07-244979 A | 9/1995 |
| JP | 2002-216457 A | 8/2002 |

(Continued)

OTHER PUBLICATIONS

Non-Final Office Action issued by USPTO dated Mar. 22, 2021, in related U.S. Appl. No. 17/022,112.

(Continued)

*Primary Examiner* — Nabil Z Hindi
(74) *Attorney, Agent, or Firm* — Solaris Intellectual Property Group, PLLC

(57) ABSTRACT

A recording and reproducing device includes: a reading unit that reads production information from a recording medium of a magnetic tape cartridge, the magnetic tape cartridge including a magnetic tape, and the recording medium other than the magnetic tape and on which the production information is recorded, the production information being information regarding the magnetic tape obtained in a production process of the magnetic tape cartridge; and a control unit that performs, as an initialization process of the magnetic tape cartridge, control of recording the production information on the magnetic tape and invalidating the production information in the recording medium.

12 Claims, 9 Drawing Sheets

(52) U.S. Cl.
CPC ............... *G11B 2020/1281* (2013.01); *G11B 2020/1292* (2013.01)

(58) Field of Classification Search
CPC .. G11B 5/70; G11B 5/65; G11B 5/127; G11B 5/7085; G11B 5/738; G11B 27/36; G11B 20/1201; G11B 2020/1281; G11B 2020/1292; G11B 2020/1278; G11B 5/02; G11B 20/1202
USPC ............ 360/48, 77.12, 71, 73.11, 72.2, 72.3, 360/78.02
See application file for complete search history.

(56) References Cited

U.S. PATENT DOCUMENTS

| | | | |
|---|---|---|---|
| 7,177,108 B2* | 2/2007 | Payne | .................. G06F 3/0682 360/69 |
| 7,310,820 B2 | 12/2007 | Tada | |
| 8,339,726 B2 | 12/2012 | Koski et al. | |
| 9,472,221 B1 | 10/2016 | Bui et al. | |
| 10,170,152 B1* | 1/2019 | Hoerger | ................. G11B 27/10 |
| 2004/0064717 A1 | 4/2004 | Tada | |
| 2005/0231845 A1* | 10/2005 | Shirouzu | ................ G11B 23/30 360/48 |
| 2011/0317310 A1 | 12/2011 | Kim et al. | |

FOREIGN PATENT DOCUMENTS

| | | |
|---|---|---|
| JP | 2004-127488 A | 4/2004 |
| JP | 2004-318983 A | 11/2004 |
| JP | 2010-231843 A | 10/2010 |
| JP | 2012-053940 A | 3/2012 |
| JP | 2015-130216 A | 7/2015 |
| JP | 2019-046521 A | 3/2019 |

OTHER PUBLICATIONS

Notice of Allowance issued by USPTO dated May 27, 2021, in related U.S. Appl. No. 17/022,112.

English language translation of the following: Office action dated Jun. 14, 2022 from the JPO in a Japanese patent application No. 2019-175123 corresponding to the instant patent application. This office action translation is submitted now in order to supplement the understanding of the cited references which are being disclosed in the instant Information Disclosure Statement.

* cited by examiner

| SERVO BAND NUMBER | SERVO POSITION NUMBER | DISTANCE D [μm] |
|---|---|---|
| 0 | 0 | 21.389 |
|   | 1 | 22.613 |
|   | 2 | 23.837 |
|   | 3 | 25.062 |
|   | 4 | 26.286 |
|   | ... | ... |
| 1 | ... | ... |
| ... | ... | ... |

IDEAL SERVO PATTERN

ACTUAL SERVO PATTERN

SP1 SP2
⎵
SP

SP1 SP2
⎵
SP

RECORDING AND REPRODUCING DEVICE, RECORDING AND REPRODUCING METHOD, AND MAGNETIC TAPE CARTRIDGE

CROSS-REFERENCE TO RELATED APPLICATIONS

This application is a continuation application of U.S. Ser. No. 17/022,112, filed on Sep. 16, 2020, which claims priority from Japanese Patent Application No. 2019-175123, filed on Sep. 26, 2019. The entire disclosure of each of the above applications is incorporated herein by reference.

BACKGROUND

Technical Field

The present disclosure relates to a recording and reproducing device, a recording and reproducing method, a non-transitory storage medium, and a magnetic tape cartridge.

Related Art

In the related art, a technology of recording information regarding a magnetic tape cartridge on a recording medium other than a magnetic tape comprised in the magnetic tape cartridge has been known, in order to efficiently operate the magnetic tape cartridge and improve a tracking accuracy of the magnetic head with respect to the magnetic tape.

JP2015-130216A and JP2019-046521A disclose a magnetic tape cartridge comprising a magnetic tape and an integrated circuit (IC) tag. In JP2015-130216A, management information such as a label name of the magnetic tape cartridge is recorded on the IC tag comprised in the magnetic tape cartridge.

In addition, in JP2019-046521A, information regarding linearity of a servo signal recorded on the magnetic tape is recorded on the IC tag comprised in the magnetic tape cartridge.

Generally, a recording medium other than a magnetic tape comprised in a magnetic tape cartridge (hereinafter, referred to as "second recording medium") has a storage capacity of approximately 4 KB (Kilobytes) to 16 KB, which is extremely smaller than that of the magnetic tape. In addition, information regarding usage history, information regarding failure history, and the like are recorded on the second recording medium, along with recording of data on the magnetic tape or reproducing thereof.

In a case where the information regarding the magnetic tape cartridge as described in JP2015-130216A and JP2019-046521A is further recorded on the second recording medium, in addition to the information, the storage capacity of the second recording medium may increase. In this case, a recording medium having a larger storage capacity is used as the second recording medium, which leads to an increase in cost.

SUMMARY

The disclosure has been made in view of the above circumstances, and a recording and reproducing device capable of preventing an increase in storage capacity of a recording medium other than a magnetic tape comprised in a magnetic tape cartridge, a recording and reproducing method, a non-transitory storage medium, and the magnetic tape cartridge.

A recording and reproducing device according to an aspect of the present disclosure comprises: a reading unit that reads production information from a recording medium of a magnetic tape cartridge, the magnetic tape cartridge including a magnetic tape, and the recording medium other than the magnetic tape and on which the production information is recorded, the production information being information regarding the magnetic tape obtained in a production process of the magnetic tape cartridge; and a control unit that performs, as an initialization process of the magnetic tape cartridge, control of recording the production information on the magnetic tape and invalidating the production information in the recording medium.

In the recording and reproducing device of the disclosure, the control unit may perform control of removing the production information from the recording medium as the control of invalidating the production information.

In the recording and reproducing device of the disclosure, retention information indicating whether or not the production information is recorded may be further recorded on the recording medium, and the control unit may perform the control, in a case in which the retention information indicates that the production information is recorded on the recording medium.

In the recording and reproducing device of the disclosure, at least one of type information or identification information of the production information may be further recorded on the recording medium, and the control unit may perform control of associating at least one of the type information or the identification information with the production information and recording the production information on the magnetic tape.

In the recording and reproducing device of the disclosure, the production information may be information used to control recording or reproducing of data with respect to the magnetic tape.

A recording and reproducing method according to another aspect of the present disclosure executed by a recording and reproducing device, the method comprises: reading production information from a recording medium of a magnetic tape cartridge, the magnetic tape cartridge including a magnetic tape, and the recording medium other than the magnetic tape and on which the production information is recorded, the production information being information regarding the magnetic tape obtained in a production process of the magnetic tape cartridge; and performing an initialization process of the magnetic tape cartridge by recording the production information on the magnetic tape and invalidating the production information in the recording medium.

Still another aspect of the present disclosure is a non-transitory storage medium storing a program that causes a recording and reproducing device to perform recording and reproducing processing, the recording and reproducing processing comprising: reading production information from a recording medium of a magnetic tape cartridge, the magnetic tape cartridge including a magnetic tape, and the recording medium other than the magnetic tape and on which the production information is recorded, the production information being information regarding the magnetic tape obtained in a production process of the magnetic tape cartridge; and performing an initialization process of the magnetic tape cartridge by recording the production information on the magnetic tape and invalidating the production information in the recording medium.

A magnetic tape cartridge according to still another aspect of the present disclosure comprises: a magnetic tape; and a recording medium other than the magnetic tape, in which production information which is information regarding the magnetic tape obtained in a production process of the magnetic tape cartridge and is to be invalidated by an initialization process of the magnetic tape cartridge, is recorded on the recording medium.

According to the disclosure, it is possible to prevent an increase in storage capacity of the recording medium other than the magnetic tape comprised in the magnetic tape cartridge.

DETAILED DESCRIPTION

Figure 1:
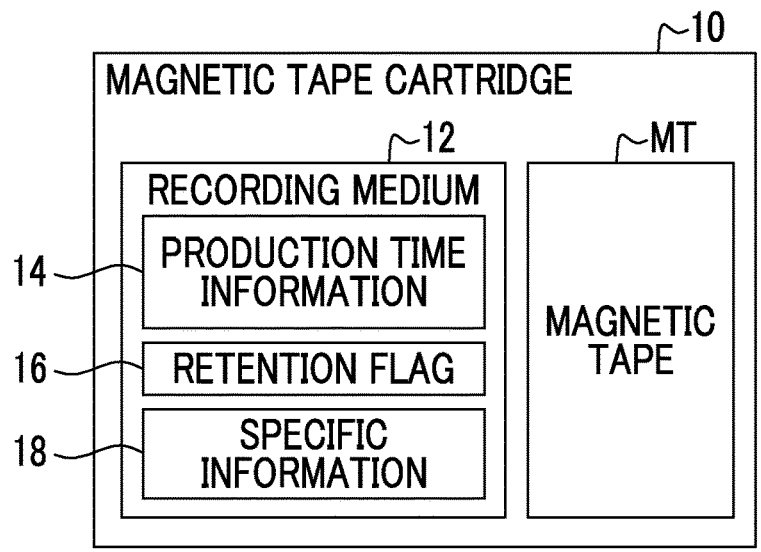
FIG. 1 is a block diagram showing an example of a configuration of a magnetic tape cartridge.

Hereinafter, embodiments for carrying out the technology of the disclosure will be described in detail with reference to the drawings.

First, servo patterns used in the following embodiments will be described before describing the details of the embodiments.

For various steps for manufacturing a magnetic tape, a description disclosed in paragraphs 0067 to 0070 of JP2010-231843A can be referred to. A servo pattern can also be formed on the magnetic tape by a well-known method, in order to realize tracking control of a magnetic head of a magnetic tape device and control of a running speed of the magnetic tape. The "formation of the servo pattern" can be "recording of a servo signal". The servo signal is generally recorded along a longitudinal direction of the magnetic tape.

As a method of control using a servo signal, timing-based servo, amplitude servo, or frequency servo is used. Hereinafter, the recording of the servo signal will be further described.

As shown in European Computer Manufacturers Association (ECMA)-319, a timing-based servo system is used in a magnetic tape based on a linear tape-open (LTO) standard (generally referred to as an "LTO tape"). In this timing-based servo method, the servo signal is configured by continuously disposing a plurality of pairs of magnetic stripes (also referred to as "servo stripes") not parallel to each other in a longitudinal direction of the magnetic tape. As described above, a reason for that the servo signal is configured with one pair of magnetic stripes not parallel to each other is because a servo reproducing element passing on the servo signal recognizes a passage position thereof. Specifically, one pair of the magnetic stripes are formed so that a gap thereof is continuously changed along the width direction of the magnetic tape, and a relative position of the servo signal and the servo reproducing element can be recognized, by the reading of the gap thereof by the servo reproducing element. The information of this relative position can realize the tracking of a data track. Accordingly, a plurality of servo tracks are generally set on the servo signal along the width direction of the magnetic tape.

The servo band is configured of a servo signal continuous in the longitudinal direction of the magnetic tape. A plurality of servo bands are normally provided on the magnetic tape. A region interposed between two adjacent servo bands is called a data band. The data band is configured to include a plurality of data tracks and each data track corresponds to each servo track.

In one embodiment, as shown in JP2004-318983A, information showing the servo band number (also referred to as "servo band identification (ID) is embedded in each servo band. This servo band ID is recorded by shifting a specific servo stripe among the plurality of pairs of servo stripes in the servo band so that the position thereof is relatively displaced in the longitudinal direction of the magnetic tape. Specifically, the method for shifting the specific servo stripe among the plurality of pairs of servo stripes is changed for each servo band. Accordingly, the recorded servo band ID is unique for each servo band, and therefore, the servo band can be uniquely specified by only reading one servo band by the servo reproducing element.

As a method for specifying the servo band, a method using shifting in the longitudinal direction between the adjacent servo bands as shown in ECMA-319 is used. In this method, the group of one pair of magnetic stripes not parallel to each other which are continuously disposed in the longitudinal direction of the magnetic tape is recorded so as to be shifted in the longitudinal direction of the magnetic tape for each servo band. A combination of this shifted servo band between the adjacent servo bands is set to be unique in the entire magnetic tape, and accordingly, the servo band can also be uniquely specified in a case of reading the adjacent servo signals by two servo reproducing elements at the same time.

In addition, as shown in ECMA-319, information showing the position in the longitudinal direction of the magnetic tape (also referred to as "LPOS information") is normally embedded in each servo band. This LPOS information is recorded so that the position of one pair of servo stripes are shifted in the longitudinal direction of the magnetic tape, in the same manner as the servo band ID. However, unlike the servo band ID, the same signal is recorded on each servo band in this LPOS information.

Other information different from the servo band ID and the LPOS information can be embedded in the servo band. In this case, the embedded information may be different for each servo band as the servo band ID, or may be common in all of the servo bands, as the LPOS information. In addition, as a method of embedding the information in the servo band, a method other than the method described above can also be used. For example, a predetermined code may be recorded by thinning out a predetermined pair among the group of pairs of the servo stripes.

A servo signal recording head is also referred to as a servo write head. The servo write head includes pairs of gaps corresponding to the pairs of magnetic stripes by the number of servo bands. In general, a core and a coil are respectively connected to each of the pairs of gaps, and a magnetic field generated in the core can generate leakage magnetic field in the pairs of gaps, by supplying a current pulse to the coil. In a case of recording the servo signal, by inputting a current pulse while causing the magnetic tape to run on the servo write head, the magnetic pattern corresponding to the pair of gaps is transferred to the magnetic tape, and the servo signal can be recorded. A width of each gap can be suitably set in accordance with a density of the servo signal to be recorded. The width of each gap can be set as, for example, equal to or smaller than 1 μm, 1 to 10 μm, or equal to or greater than 10 μm.

Before recording the servo signal on the magnetic tape, a demagnetization (erasing) process is generally performed on the magnetic tape. This erasing process can be performed by applying a uniform magnetic field to the magnetic tape by using a DC magnet and an AC magnet. The erasing process includes direct current (DC) erasing and alternating current (AC) erasing. The AC erasing is performed by slowly decreasing an intensity of the magnetic field, while reversing a direction of the magnetic field applied to the magnetic tape. Meanwhile, the DC erasing is performed by adding the magnetic field in one direction to the magnetic tape. The DC erasing further includes two methods. A first method is horizontal DC erasing of applying the magnetic field in one direction along a longitudinal direction of the magnetic tape. A second method is vertical DC erasing of applying the magnetic field in one direction along a thickness direction of the magnetic tape. In addition, the erasing process can also be performed in an oblique direction. The erasing process may be performed with respect to all of the magnetic tape or may be performed for each servo band area of the magnetic tape.

A direction of the magnetic field to the servo signal to be recorded is determined in accordance with the direction of erasing. For example, in a case where the horizontal DC erasing is performed to the magnetic tape, the recording of the servo signal is performed so that the direction of the magnetic field and the direction of erasing are opposite to each other. Accordingly, the output of the servo signal obtained by the reading of the servo signal can be increased. As disclosed in JP2012-053940A, in a case where the pattern is transferred to the magnetic tape subjected to the vertical DC erasing by using the gap, the reading signal of the recorded servo signal has a unipolar pulse shape. Meanwhile, in a case where the pattern is transferred to the magnetic tape subjected to the horizontal DC erasing by using the gap, the reading signal of the recorded servo signal has a bipolar pulse shape.

As a head other than the magnetic head which performs at least one of the recording of data or the reproducing of data, a magnetic head comprising a servo reproducing element may be included in the magnetic tape device. For example, the magnetic head can include two servo reproducing elements, and each of the two servo reproducing elements can simultaneously read two adjacent servo bands. One or a plurality of elements for data can be disposed between the two servo reproducing elements.

A configuration of a magnetic tape cartridge 10 according to the embodiment will be described with reference to FIGS. 1 and 2. As shown in FIG. 1, the magnetic tape cartridge 10 comprises a magnetic tape MT on which information is magnetically recorded, and a recording medium 12 as an example of a recording medium, other than the magnetic tape MT, capable of recording and reading of information by wireless communication or the like in a contactless manner. In the embodiment, an example in which a radio frequency identifier (RFID) tag is used as the recording medium 12 will be described. On the recording medium 12, production time information 14, a retention flag 16, specific information 18, and the like are recorded. The production time information 14 is an example of "production information" which is information regarding the magnetic tape MT obtained in a production process of the magnetic tape cartridge 10. The retention flag 16 is an example of retention information indicating whether or not the production time information is recorded. In addition, the production time information 14 is used to control recording or reproducing of data with respect to the magnetic tape. The production time information 14, the retention flag 16, and the specific information 18 will be described later in detail. An example of the magnetic tape MT is an LTO tape.

Figure 2:
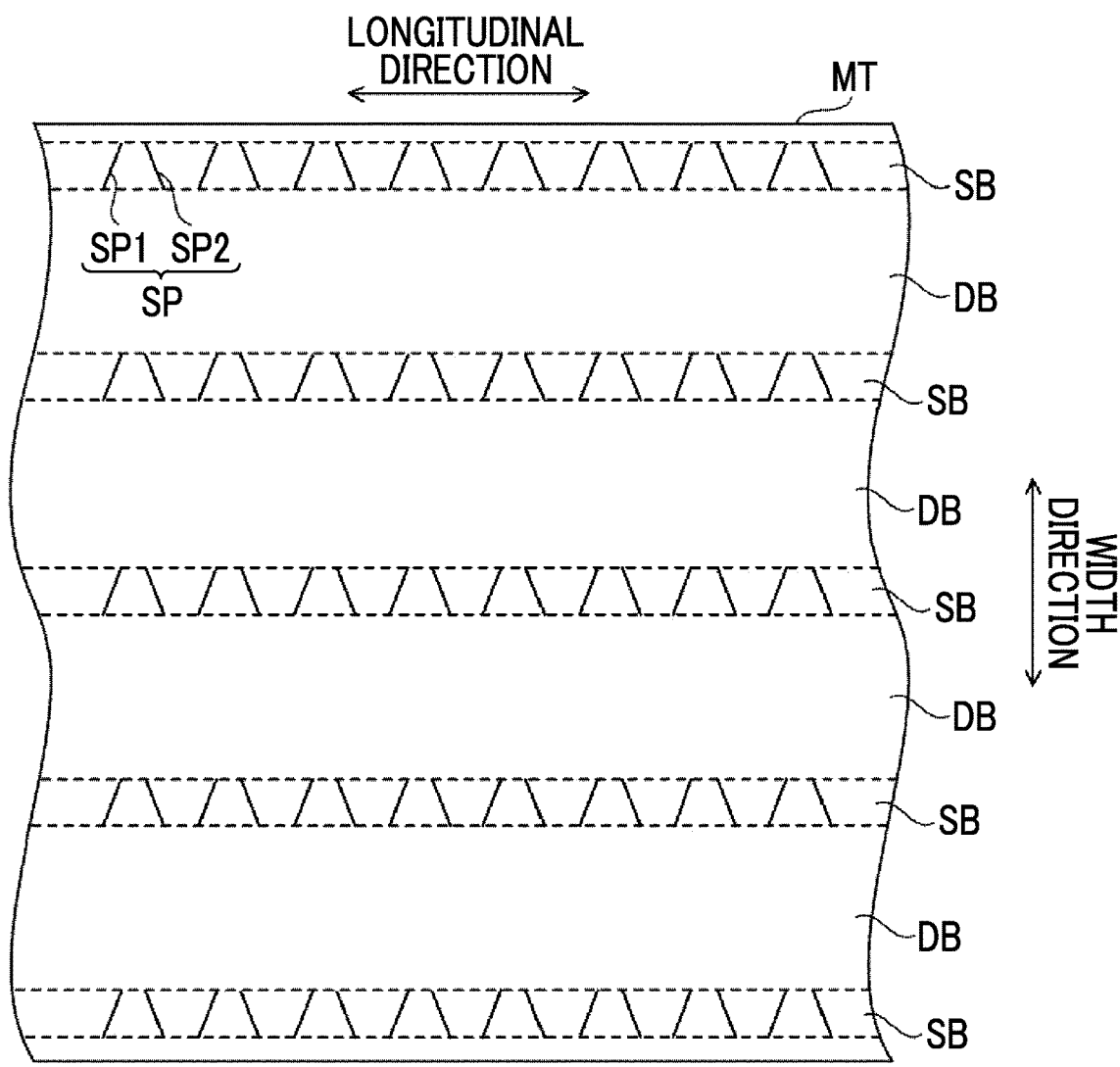
FIG. 2 is a plan view showing an example of a magnetic tape.

As shown in FIG. 2, five servo bands SB are formed on the magnetic tape MT along a longitudinal direction of the magnetic tape MT. In addition, the five servo bands SB are formed so as to be arranged in a width direction (short direction) of the magnetic tape MT at regular intervals. A data band DB, on which data is recorded, is formed between each of the five servo bands SB. In other words, the servo bands SB and the data bands DB are arranged alternately along the width direction of the magnetic tape MT. The number of the servo bands SB and the data bands DB is not limited to the example shown in FIG. 2. For example, the number of servo bands SB may be 3 and the number of data bands DB may be 2. Hereinafter, the longitudinal direction of the magnetic tape MT is referred to as a "tape longitudinal direction" and the width direction of the magnetic tape MT is referred to as a "tape width direction".

On the servo band SB, servo patterns SP for performing positioning of a magnetic head H (see FIG. 3) in the tape width direction are repeatedly formed in the tape longitudinal direction. The servo pattern SP includes a linear pattern SP1 and a linear pattern SP2 which are formed along the tape width direction to be tilted with respect to the tape width direction by a predetermined angle. The linear pattern SP2 is formed not to be parallel with the linear pattern SP1. In the embodiment, the linear pattern SP2 is formed so as to be linearly symmetrical to the linear pattern SP1, with respect to the linear line along the tape width direction. FIG. 2 shows an example in which the servo pattern SP includes one pair of the linear pattern SP1 and the linear pattern SP2, but the servo pattern SP may include the plurality of pairs of linear patterns SP1 and the linear patterns SP2.

Next, a process of positioning the magnetic head H with respect to the tape width direction of the magnetic tape MT on which the servo pattern SP is formed will be described with reference to FIGS. 3 and 4.

Figure 3:
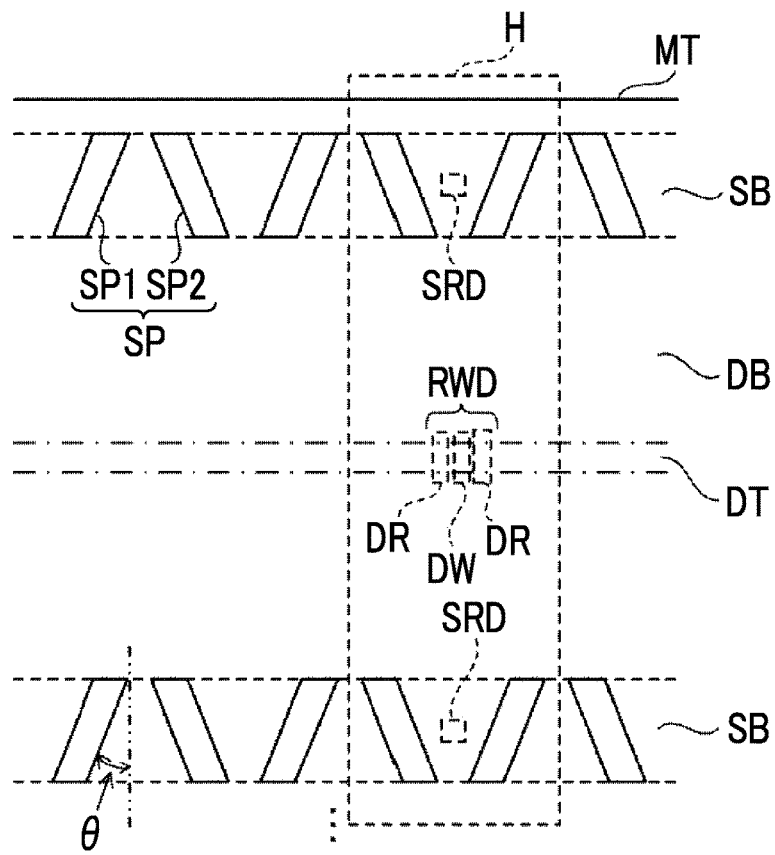
FIG. 3 is a plan view for explaining a positioning process of a magnetic head.

As shown in FIG. 3, the magnetic head H includes a servo reproducing element SRD which reproduces the servo pattern SP recorded on the servo band SB, and a recording and reproducing element RWD which performs recording or reproducing of data with respect to the data track DT. The recording and reproducing element RWD includes a data reproducing element DR which reproduces data and a data recording element DW which records data. In the embodiment, the recording and reproducing element RWD comprises the data reproducing elements DR on both sides of the data recording element DW in the tape longitudinal direction. This is because the data reproducing element DR arranged on a rear side in the running direction of the magnetic tape MT performs verification after recording data, with respect to the data recording element DW, in both cases of unwinding the magnetic tape MT from the magnetic tape cartridge 10 and winding the magnetic tape MT again. The reproducing here refers to reading a signal representing the servo pattern SP or data recorded on the magnetic tape MT. Hereinafter, the position of the magnetic head H, the position of the servo reproducing element SRD, and the position of the recording and reproducing element RWD, which are simply noted, respectively mean positions along the tape width direction.

The magnetic head H according to the embodiment comprises two servo reproducing elements SRD which read the servo patterns SP recorded on the servo bands SB adjacent to each other in the tape width direction. In addition, the recording and reproducing element RWD is arranged along the tape width direction between the two servo reproducing elements SRD.

In the embodiment, in a case where the magnetic tape MT runs in a predetermined running direction (for example, right to left direction in FIG. 3), the servo reproducing element SRD of the magnetic head H is positioned at a predetermined position within the servo band SB in the tape width direction, thereby positioning the magnetic head H with respect to the magnetic tape MT. Hereinafter, the running direction simply written means the running direction of the magnetic tape MT.

In a case where the linear pattern SP1 and the linear pattern SP2 pass through a detection position of the servo reproducing element SRD, the servo reproducing element SRD detects the linear pattern SP1 and the linear pattern SP2. In this case, the magnetic head H is positioned at a position so that a detection interval of the linear pattern SP1 and the linear pattern SP2 is a predetermined value. Accordingly, the recording and reproducing element RWD of the magnetic head H follows a predetermined data track DT. For the positioning of the magnetic head H, for example, an average value of the detection intervals of the two servo reproducing elements SRD is used.

Figure 4:
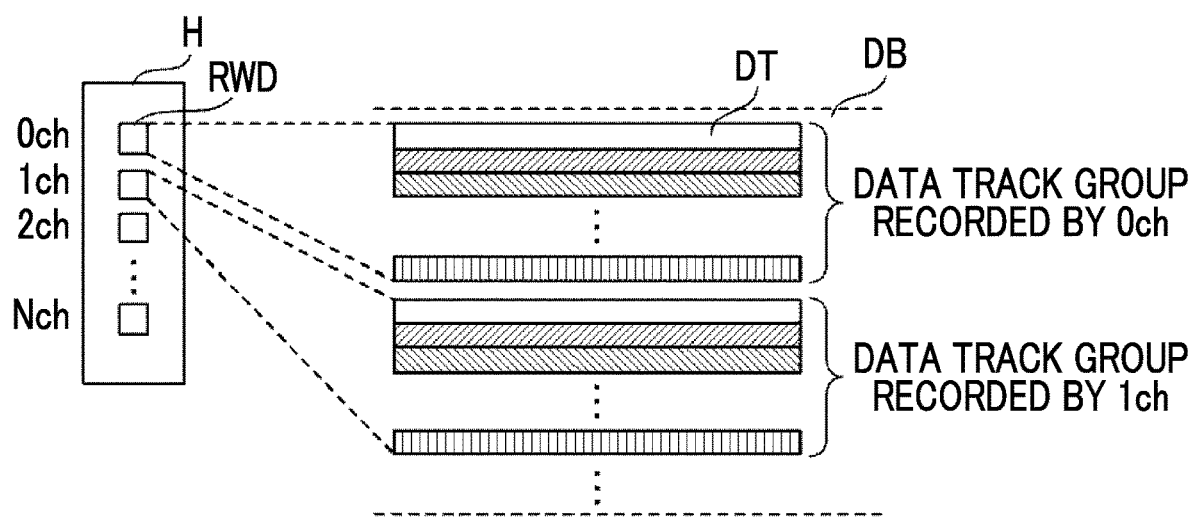
FIG. 4 is a diagram for explaining a process of recording or reproducing data by a recording and reproducing element.

In addition, as shown in FIG. 4, the plurality of recording and reproducing elements RWD can be arranged between the two servo reproducing elements SRD along the tape width direction and perform recording and reproducing of data at the same time with respect to the plurality of data tracks DT. In addition, as shown in FIG. 4, one data band DB includes a plurality of data track groups including a plurality of data tracks DT on which data is recorded by each recording and reproducing element RWD.

Next, a configuration of a servo writer SW which records the servo pattern SP on each servo band SB of the magnetic tape MT according to the embodiment will be described with reference to FIGS. 5A and 5B.

Figure 5A:
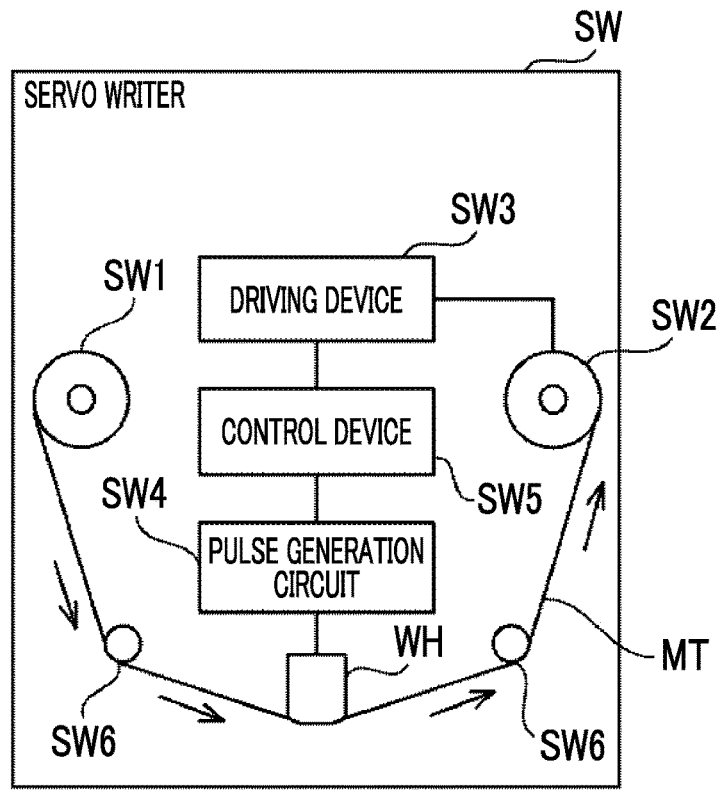
FIG. 5A is a diagram showing an example of a configuration of a servo writer.

As shown in FIG. 5A, the servo writer SW comprises a sending reel (supply real) SW1, a winding reel (take-up reel) SW2, a driving device SW3, a pulse generation circuit SW4, a control device SW5, and a servo signal write head WH. In addition, the servo writer SW also comprises a power device, a cleaning device which cleans the magnetic tape MT, a verifying device which performs inspection of the servo pattern SP recorded on the magnetic tape MT, and the like which are not shown.

In the sending reel SW1, the magnetic tape MT cut to have a product width from a raw web having a wide width, before writing the servo pattern SP is set on a pancake reel having a large diameter, and the magnetic tape MT is sent while writing the servo pattern SP. The magnetic tape MT sent from the sending reel SW1 is guided to a guide SW6 and the like and transported to the servo signal write head WH. The magnetic tape MT in which the servo pattern SP is recorded on each servo band SB with the servo signal write head WH is guided to the guide SW6 and the like and transported to the winding reel SW2. The winding reel SW2 is rotatably driven by the driving device SW3, and the magnetic tape MT on which the servo pattern SP is recorded is wound up.

The driving device SW3 is a device for rotatably driving the winding reel SW2, and comprises a motor, a motor driving circuit for supplying a current to the motor, a gear for connecting a motor axis and the winding reel SW2, and the like which are not shown. In the driving device SW3, a motor current is generated by the motor driving circuit based on a motor current signal from the control device SW5, this motor current is supplied to the motor, and a rotation driving force of the motor is transmitted to the winding reel SW2 through the gear to rotatably drive the winding reel SW2.

The pulse generation circuit SW4 is a circuit which supplies a recording pulse current to a plurality of coils C (see FIG. 5B) provided in the servo signal write head WH based on the pulse control signal from the control device SW5, and is independently provided in each of the plurality of coils C. Specifically, the pulse generation circuit SW4 alternately generates a pulse current having positive polarity or negative polarity and a zero current, based on the pulse control signal from the control device SW5, and accordingly, the servo pattern SP is recorded at a predetermined position of each servo band SB. The recording pulse current is a current value sufficient for magnetizing the magnetic layer of the magnetic tape MT by a leakage magnetic flux from a gap pattern G (see FIG. 5B), and is set by considering properties of the coil C of the servo signal write head WH.

Figure 5B:
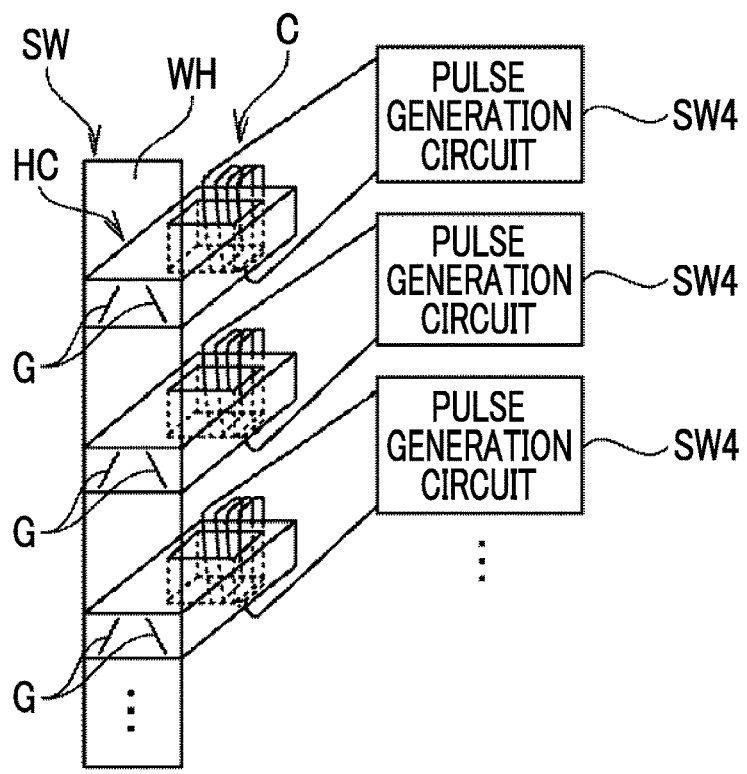
FIG. 5B is a diagram showing an example of a configuration of a servo writer.

As shown in FIG. 5B, the servo signal write head WH includes the linear gap pattern G provided at a position corresponding to each servo band SB, and the servo pattern SP is recorded on the servo band SB of the magnetic tape MT with each gap pattern G One linear pattern of the gap pattern G is tilted according to the angle of the linear pattern SP1, and the other linear pattern is not parallel to the one linear pattern according to the linear pattern SP2. The gap pattern G is an example of a servo recording element which records the servo pattern SP on the servo band SB.

In addition, a head core HC is independent for each gap pattern and each coil C is wound around the head core HC. Each pulse generation circuit SW4 connected to each coil C converts the data for distinguishing each servo band SB encoded in the control device SW5 into a pattern of the recording pulse current, and the recording pulse current is supplied to the coil C according to this pattern. Accordingly, unique identification information corresponding to each servo band SB is embedded in the servo pattern SP of each servo band SB. The head core HC may not be independent for each gap pattern G and, for example, one head core HC may be provided for all of the gap patterns G In this case, the servo pattern SP is collectively recorded on each servo band SB by one recording pulse current.

Figure 6:
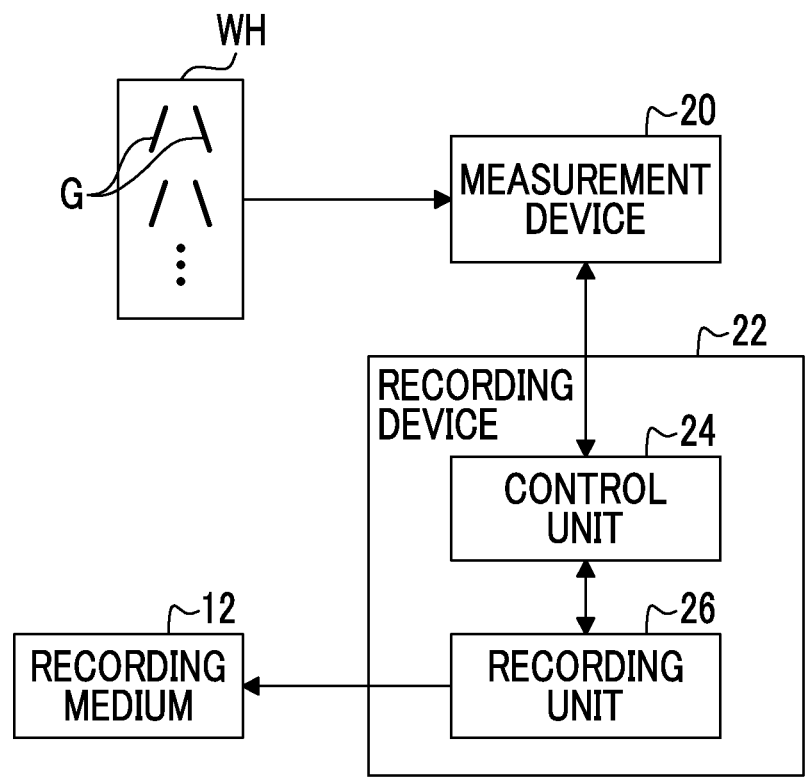
FIG. 6 is a block diagram showing an example of configurations of a measurement device and a recording device.

Next, with reference to FIG. 6, configurations of a measurement device 20 and a recording device 22 for recording the production time information 14 on the recording medium 12 of the magnetic tape cartridge 10 in the production process of the magnetic tape cartridge 10 will be described. Examples of the measurement device 20 include a magnetic force microscope (MFM), a scanning electron microscope (SEM), and a laser microscope. As shown in FIG. 6, the recording device 22 includes a control unit 24 including a central processing unit (CPU) and a memory as a temporary storage, and a recording unit 26 which records information on the recording medium 12 in a contactless manner.

The measurement device 20 performs measurement regarding the servo signal write head WH of the servo writer SW and outputs a signal corresponding to a distance between two linear patterns of each gap pattern G in a direction corresponding to the tape longitudinal direction.

Figure 7:
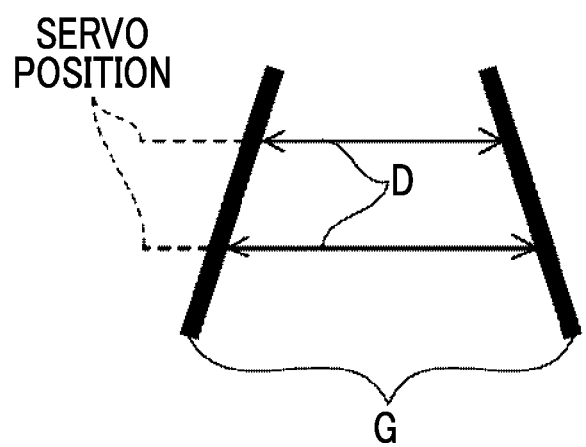
FIG. 7 is a diagram for explaining a distance between linear patterns of servo patterns.

The control unit 24 of the recording device 22 obtains a signal output from the measurement device 20. As shown in FIG. 7 as an example, the control unit 24 derives a distance D between two linear patterns of each gap pattern G in the tape longitudinal direction by using the obtained signal. The control unit 24 derives the distance D at each position (hereinafter, referred to as a "servo position") corresponding to the servo pattern SP along the tape width direction. This servo position corresponds to each data track DT of each data track group described above. That is, for example, in a case where each data track group includes six data tracks DT, the servo positions are six positions. The control unit 24 controls the recording unit 26 and records the derived distance D on the recording medium 12 as the production time information 14 by associating with the servo band SB number corresponding to each gap pattern G and the number of the servo position (i.e., servo position number).

Figures 8, 9:
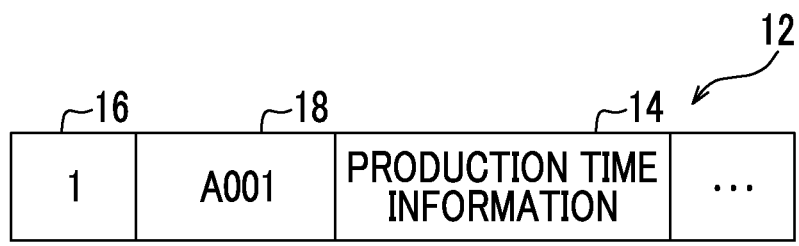
FIG. 8 is a diagram showing an example of production time information.
FIG. 9 is a diagram showing an example of recorded contents of a recording medium in a production process of the magnetic tape cartridge.

FIG. 8 shows an example of the production time information 14. As shown in FIG. 8, the distance D corresponding to each of a combination of the number of the servo band SB and the number of the servo position is included in the production time information 14. The example shown in FIG. 8 shows the distance D at each servo position, in a case where the servo pattern SP, in which an azimuth angle is 12°, a length in the tape width direction is 93 and a distance between the linear pattern SP1 and the linear pattern SP2 at a position of a middle point in the tape width direction (that is, position at 46.5 μm (=93/2)) in the longitudinal direction is 38 μm, is assumed. As shown in FIG. 3, the azimuth angle here refers to an angle (θ in FIG. 3) of the linear pattern SP1 with respect to a straight line (two-dot chain line in FIG. 3) along the tape width direction in the line-symmetric servo pattern SP.

From this distance D, which servo position the distance D corresponds to is calculated based on Expression (1). The "distance at the middle point" in Expression (1) means a distance between the linear pattern SP1 and the linear pattern SP2 in the tape longitudinal direction at the position of the middle point of the servo pattern SP in the tape width direction (in the example of FIG. 8, 38 μm). That is, in Expression (1), the servo position is calculated by the distance in the tape width direction based on the position of the middle point of the servo pattern SP in the tape width direction.

$$\text{Servo position} = \frac{\text{Distance at middle point} - \text{Distance } D}{2 \times \tan \text{Azimuth angle}} \quad (1)$$

In addition, as shown in FIG. 9, the control unit 24 controls the recording unit 26 to record the retention flag 16 on the recording medium 12. The retention flag 16 is information indicating whether or not the production time information 14 is recorded on the recording medium 12. In the embodiment, in a case where the production time information 14 is recorded on the recording medium 12, "1" is recorded as the retention flag 16, and in a case where the production time information 14 is not recorded on the recording medium 12, "0" is recorded as the retention flag 16.

In addition, as shown in FIG. 9, the control unit 24 controls the recording unit 26 to record the specific information 18 corresponding to the production time information 14 on the recording medium 12. The specific information 18 according to the embodiment is information obtained by combining type information of the production time information 14 ("A" in the example of FIG. 9) and the identification information for identifying the production time information 14 within the same type ("001" in the example of FIG. 9). The specific information 18 which is a combination of the type information and the identification information makes it possible to specify that the production time information 14 is the distance D between the two linear patterns of the gap patterns G in the tape longitudinal direction described above.

Next, referring to FIG. 10, an example of a flow of a servo recording process of recording the servo pattern SP on the magnetic tape MT and recording the production time information 14, the retention flag 16, and the specific information 18 on the recording medium 12 in the production process of the magnetic tape cartridge 10 will be described.

Figure 10:
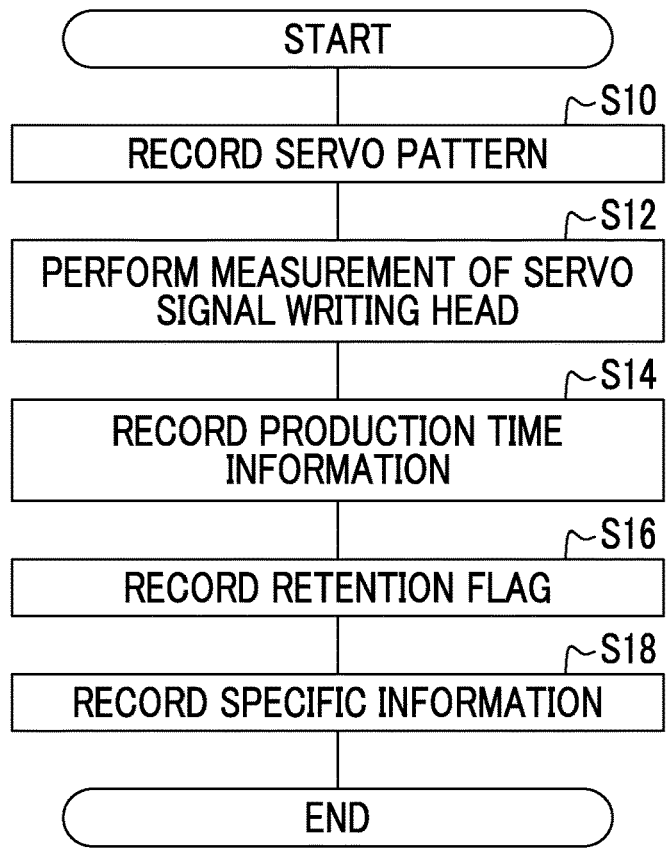
FIG. 10 is a flowchart showing an example of a servo recording process.

In Step S10 of FIG. 10, as described above, the servo writer SW records the servo pattern SP on each servo band SB of the magnetic tape MT by the corresponding gap pattern G of the servo signal write head WH under the control of the control device SW5.

In Step S12, as described above, the measurement device 20 performs the measurement regarding the servo signal write head WH of the servo writer SW used in the process of Step S10, and outputs a signal of a measurement result. In Step S14, the control unit 24 of the recording device 22 derives the distance D using a signal output by the process of Step S12, as described above. The control unit 24 controls the recording unit 26 and records the derived distance D on the recording medium 12 as the production time information 14 by associating with the number of the servo band SB corresponding to each gap pattern G and the number and the servo position.

In Step S16, the control unit 24 controls the recording unit 26 to record "1" as the retention flag 16 on the recording medium 12. In Step S18, the control unit 24 controls the recording unit 26 to record the specific information 18 corresponding to the production time information 14 recorded in Step S14 on the recording medium 12. In a case where the process of Step S18 ends, the servo recording process ends.

The process order of the servo recording process is not limited to the example shown in FIG. 10. For example, the process of Step S10 may be executed after the processes of Steps S12 to S18 have been executed, or the order of Steps S10 and S12 may be interchanged. By the above process, the servo pattern SP is recorded on the servo band SB, and the magnetic tape cartridge 10 in which the production time information 14, the retention flag 16, and the specific information 18 are recorded on the recording medium 12 is produced and shipped.

Figure 11:
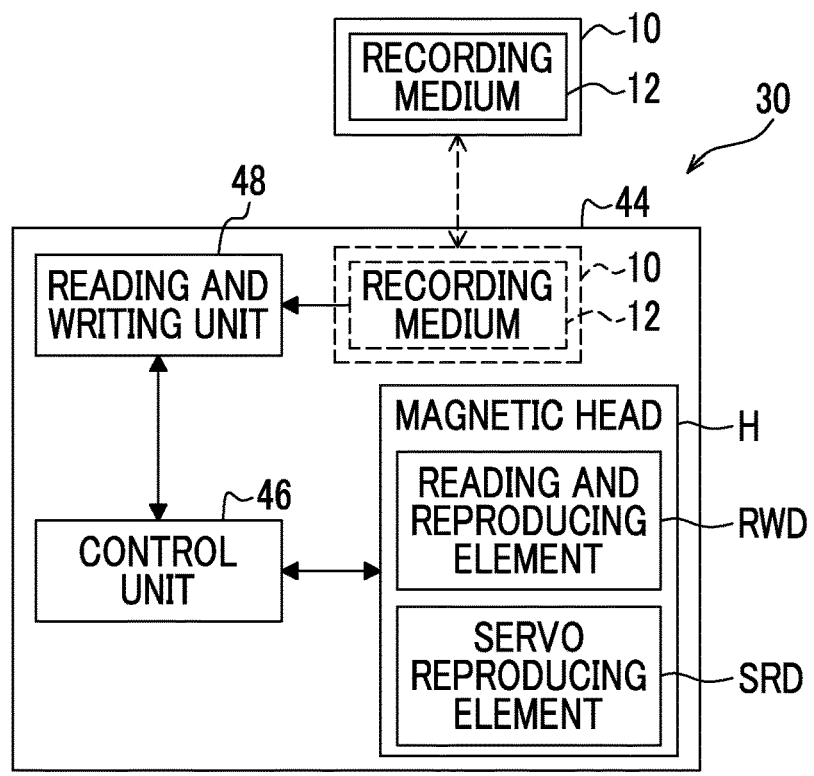
FIG. 11 is a block diagram showing an example of a configuration of a recording and reproducing system.

Next, a configuration of a recording and reproducing system 30 which performs recording and reproducing of data with respect to the shipped magnetic tape cartridge 10 will be described with reference to FIG. 11. As shown in FIG. 11, the recording and reproducing system 30 comprises the magnetic tape cartridge 10, a tape drive 44, and a computer (not shown) for controlling the tape drive 44. The tape drive 44 is an example of a recording and reproducing device according to the technology of the disclosure.

The magnetic tape cartridge 10 is loaded in the tape drive 44. In addition, after completing the recording or reproducing of the data with respect to the magnetic tape MT of the magnetic tape cartridge 10 loaded in the tape drive 44, the magnetic tape cartridge 10 is unloaded from the tape drive 44.

The tape drive 44 comprises a control unit 46, a reading and writing unit 48, and the magnetic head H. The control unit 46 is an example of the control unit according to the technology of the disclosure, and the reading and writing unit 48 is an example of the reading unit according to the technology of the disclosure. The magnetic head H comprises the plurality of recording and reproducing elements RWD, and the plurality (in the embodiment, two) of servo reproducing elements SRD corresponding to each of the adjacent servo bands SB. In addition, in the embodiment, the number of recording and reproducing elements RWD comprised in the magnetic head H is the same as the number of data track groups comprised in one data band DB. The number of recording and reproducing elements RWD comprised in the magnetic head H may not be the same as the number of data track groups comprised in one data band DB.

The reading and writing unit 48 reads the information recorded on the recording medium 12 embedded in the magnetic tape cartridge 10 in a contactless manner and outputs the read information to the control unit 46, by the control of the control unit 46. The reading and writing unit 48 records information on the recording medium 12 in a contactless manner by the control of the control unit 46. As an example of the reading and writing unit 48, an RFID reader and writer are used.

The control unit 46 includes a programmable logic device (PLD), a memory as a temporary storage, and a non-volatile storage unit. The control unit 46 may be implemented by a processor other than the PLD, such as a CPU, or may be implemented by a plurality types of processors. For example, in a case where the control unit 46 is implemented by the CPU, the CPU has the same function as the PLD by executing the program.

Figure 12:
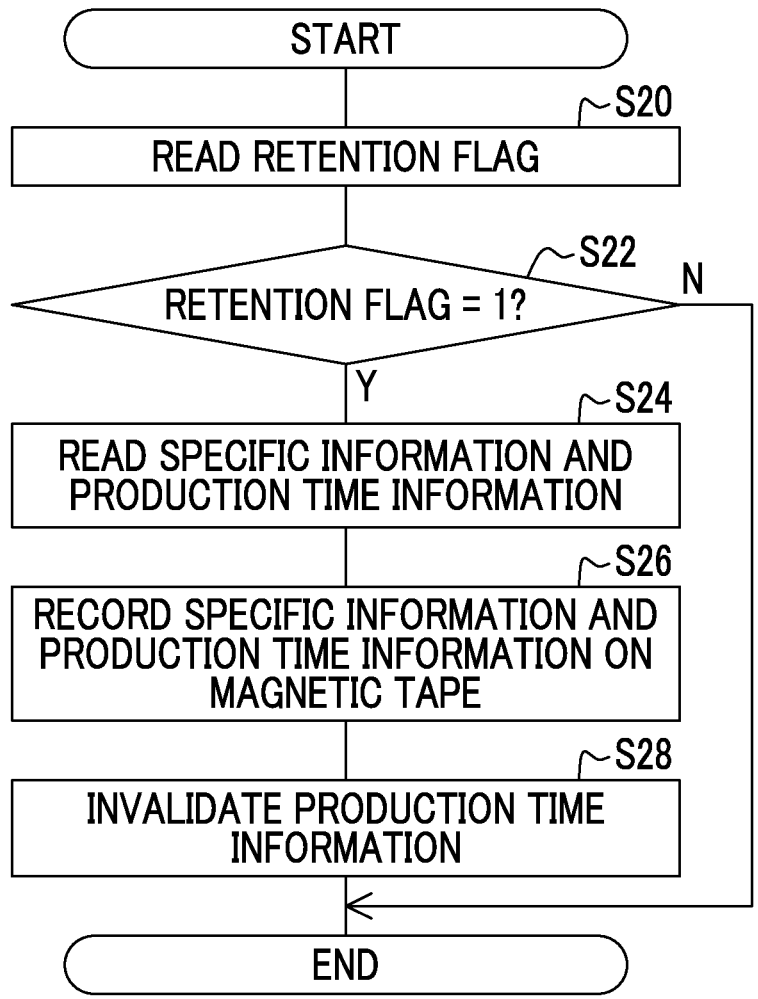
FIG. 12 is a flowchart showing an example of a part of initialization process.

Next, a flow of a part of the initialization process for the recording and reproducing system 30 to initialize the magnetic tape cartridge 10 will be described with reference to FIG. 12. A part of the initialization process shown in FIG. 12 is executed, for example, in a case where the magnetic tape cartridge 10 is loaded into the tape drive 44 for the first time. The first time here includes not only the first time after shipping the magnetic tape cartridge 10 but also the first time after the formatting is performed after the magnetic tape cartridge 10 is used. It is possible to determine whether or not the magnetic tape cartridge 10 is loaded into the tape drive 44 for the first time by an initialization flag (for example, "Block 1 Protection Flag" defined in ECMA-319). In addition, here, the data recording process is executed in a state where the magnetic tape cartridge 10 is loaded in the tape drive 44. In addition, the description of the initialization process performed according to various magnetic tape cartridge standards or specifications of the magnetic tape cartridge 10 such as the LTO standard will be omitted here.

In Step S20 of FIG. 12, the control unit 46 controls the reading and writing unit 48 to read the retention flag 16 recorded on the recording medium 12. Then, the control unit 46 obtains the retention flag 16 read by the reading and writing unit 48. In Step S22, the control unit 46 determines whether or not the retention flag 16 obtained in Step S20 is "1". In a case where the determination is negative, it is determined that the production time information 14 is not retained in the recording medium 12, and the processes of Steps S24 to S28 are skipped. In a case where the determination is affirmative, the process proceeds to Step S24.

In Step S24, the control unit 46 controls the reading and writing unit 48 to read the specific information 18 and the production time information 14 recorded on the recording medium 12. Then, the control unit 46 obtains the specific information 18 and the production time information 14 read by the reading and writing unit 48. In Step S26, the control unit 46 controls the magnetic head H, and associates the specific information 18 and the production time information 14 obtained in Step S24 and records these in an area of the magnetic tape MT retaining management information (for example, area of a predetermined range of the magnetic tape MT at a leading portion).

In Step S28, the control unit 46 controls the reading and writing unit 48 to remove the production time information 14 recorded on the recording medium 12 and change the retention flag 16 to "0", as a result the production time information 14 of the recording medium 12 is invalidated. The control unit 46 can also invalidate the production time information 14 of the recording medium 12 only by changing the retention flag 16 to "0". In a case where the process of Step S28 ends, a part of the initialization process shown in FIG. 12 ends. In a case where a part of the initialization process shown in FIG. 12 is completed, the magnetic tape cartridge 10 is unloaded from the tape drive 44. After the completion of a part of the initialization process shown in FIG. 12, the next operation may be waited without unloading the magnetic tape cartridge 10 from the tape drive 44.

Figure 13:
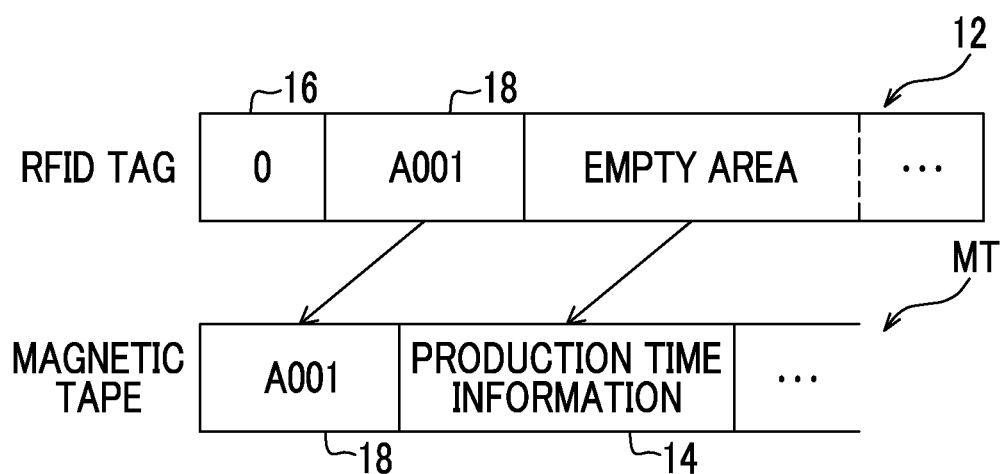
FIG. 13 is a diagram showing an example of recorded contents of the recording medium and the magnetic tape after an initialization process.

As shown in FIG. 13, the specific information 18 and the production time information 14 recorded on the recording medium 12 are associated with each other and recorded on the magnetic tape MT by a part of the above initialization process. In the embodiment, the specific information 18 and the production time information 14 are associated with each other by recording the production time information 14 immediately after the specific information 18. In addition, as shown in FIG. 13, the production time information 14 recorded on the recording medium 12 is removed from the recording medium 12. Accordingly, the storage area of the recording medium 12 in which the production time information 14 is recorded becomes an empty area. In this empty area, information regarding a usage history and information regarding a failure history are recorded in a case where data is recorded or reproduced with respect to the magnetic tape MT after the initialization process. As a result, it is possible to prevent an increase in the storage capacity of the recording medium 12.

Figure 14:
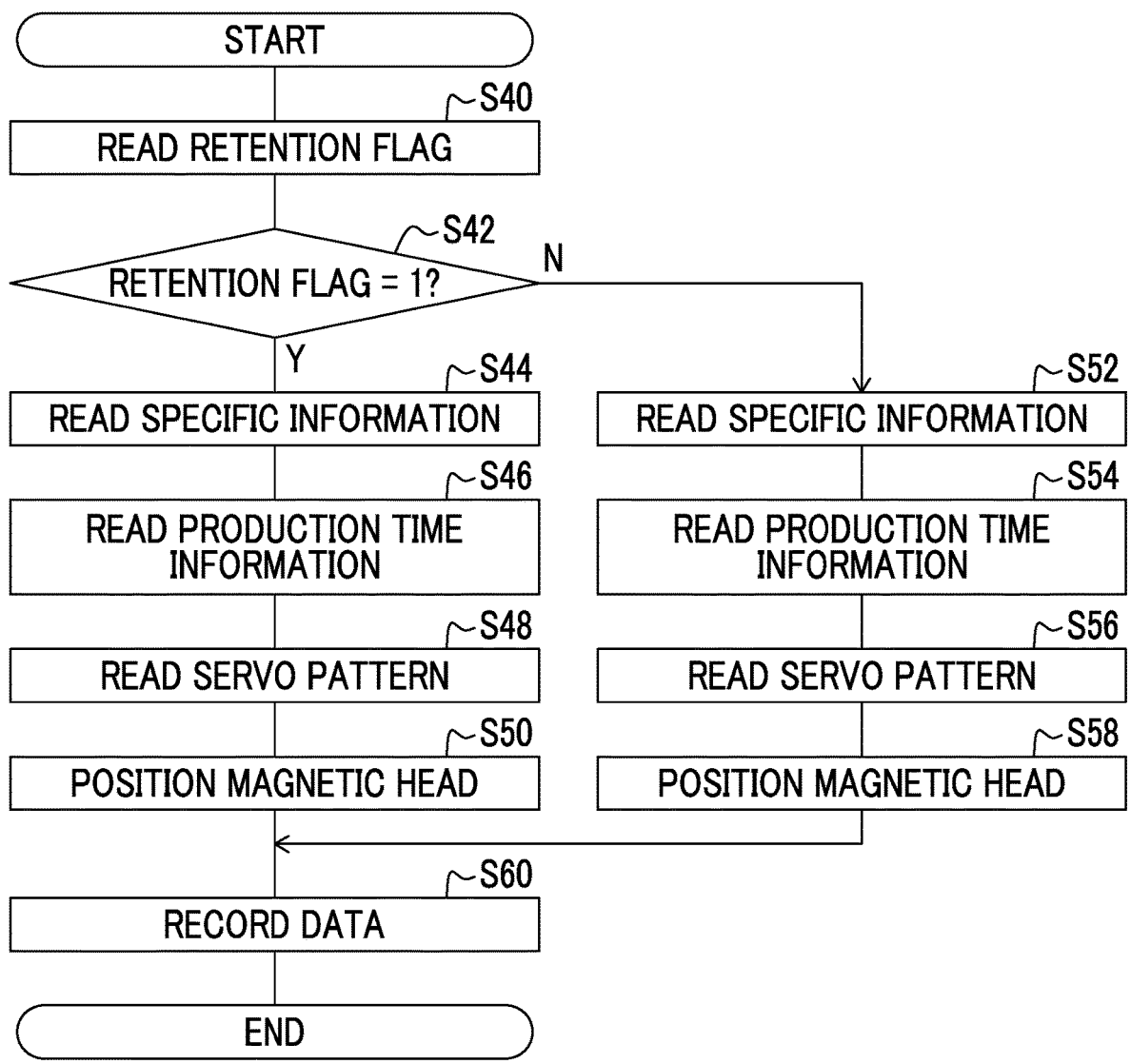
FIG. 14 is a flowchart showing an example of a data recording process.

Next, a flow of a data recording process for the recording and reproducing system 30 to record data on the magnetic tape cartridge 10 will be described with reference to FIG. 14. The data recording process shown in FIG. 14 is executed, for example, in a case where recording target data is input to the control unit 46 of the tape drive 44 from a computer for controlling the tape drive 44. In addition, here, the data recording process is executed in a state where the magnetic tape cartridge 10 is loaded in the tape drive 44.

In Step S40 of FIG. 14, the control unit 46 controls the reading and writing unit 48 to read the retention flag 16 recorded on the recording medium 12. Then, the control unit 46 obtains the retention flag 16 read by the reading and writing unit 48. In Step S42, the control unit 46 determines whether or not the retention flag 16 obtained in Step S40 is "1". In a case where the determination is negative, the process proceeds to Step S52, and in a case where the determination is affirmative, the process proceeds to Step S44.

In Step S44, the control unit 46 controls the reading and writing unit 48 to read the specific information 18 recorded on the recording medium 12. Then, the control unit 46 obtains the specific information 18 read by the reading and writing unit 48. In Step S46, the control unit 46 controls the reading and writing unit 48 to read the production time information 14 recorded on the recording medium 12. Then, the control unit 46 obtains the production time information 14 read by the reading and writing unit 48.

In Step S48, the control unit 46 controls the magnetic head H to cause the servo reproducing element SRD to read the predetermined number of servo patterns SP recorded in the servo band SB. In Step S50, the control unit 46 performs the positioning of the magnetic head H based on the time interval of the timing when the linear pattern SP1 and the linear pattern SP2 are read by the process of Step S48, and the production time information 14 obtained by the process of Step S46. In a case where the process of Step S50 ends, the process proceeds to Step S60.

In Step S52, the control unit 46 controls the magnetic head H to read the specific information 18 recorded on the magnetic tape MT. Then, the control unit 46 obtains the specific information 18 read by the magnetic head H. In Step S54, the control unit 46 controls the magnetic head H to read the production time information 14 recorded in an area of the magnetic tape MT retaining management information, immediately after the specific information 18 obtained in Step S52. Then, the control unit 46 obtains the production time information 14 read by the magnetic head H.

In Step S56, the control unit 46 controls the magnetic head H to cause the servo reproducing element SRD to read the predetermined number of servo patterns SP recorded in the servo band SB. In Step S58, the control unit 46 performs the positioning of the magnetic head H based on the time interval of the timing when the linear pattern SP1 and the linear pattern SP2 are read by the process of Step S56, and the production time information 14 obtained by the process of Step S54. In a case where the process of Step S58 ends, the process proceeds to Step S60.

In Step S60, the control unit 46 controls the magnetic head H to record the data on the data band DB. In a case where the process of Step S60 ends, the data recording process ends. In a case where the recording of the recording target data on the magnetic tape MT is completed by the data recording process, the magnetic tape cartridge 10 is unloaded from the tape drive 44. After the completion of the recording of the recording target data on the magnetic tape MT, the next operation may be waited without unloading the magnetic tape cartridge 10 from the tape drive 44. In addition, the production time information 14 may be read from both the recording medium 12 and the magnetic tape MT in Step S46. In this case, in a case where the production time information 14 read from the recording medium 12 and the production time information 14 read from the magnetic tape MT are different from each other, the data recording process may end as an error, or any of the production time information 14 may be used preferentially.

The process of reading the data recorded on the magnetic tape cartridge 10 can be executed in the same manner as the data recording process shown in FIG. 14.

As described above, according to the embodiment, as the initialization process of the magnetic tape cartridge 10, the production time information 14 of the recording medium 12 is recorded on the magnetic tape MT, and the production time information 14 is removed from the recording medium 12. Therefore, it is possible to prevent an increase in storage capacity of the recording medium 12 which is a recording medium other than the magnetic tape MT comprised in the magnetic tape cartridge 10.

Figure 15:
FIG. 15 is a diagram showing an example of an ideal servo pattern and an actual servo pattern.
Figure 15:
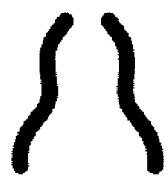
Figure 15:
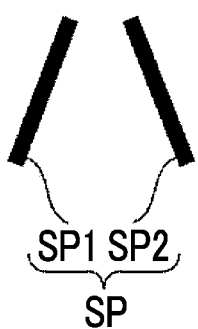
Figure 15:
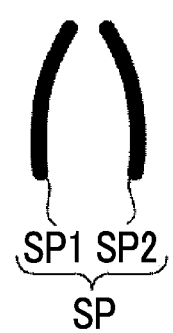

In addition, as an example shown in FIG. 15, the servo pattern SP is ideally recorded linearly, but in practice, it may be curved. With respect to this, in the embodiment, in consideration of the fact that the servo pattern SP is curved, the positioning of the magnetic head H is performed using the production time information 14 obtained by measuring the gap pattern G in which the servo pattern SP is actually formed on the magnetic tape MT. Therefore, the magnetic head H can be accurately positioned.

In the embodiment described above, as the initialization process of the magnetic tape cartridge 10, the production time information 14 is removed from the recording medium 12 to invalidate the production time information 14, but there is no limitation thereto. For example, as the initialization process of the magnetic tape cartridge 10, the production time information 14 may be invalidated by allowing the production time information 14 recorded on the recording medium 12 to be overwritten. In this case, for example, three embodiments of recording of information such as recording the production time information in a non-overwritable state, recording the production time information in an overwritable state, and not recording the production time information, are exemplified as the retention flag 16.

In addition, in the embodiment, the case where the distance D between the two linear patterns of each gap pattern G in the tape longitudinal direction is applied as the production time information has been described, but there is no limitation thereto. As the production time information, for example, information regarding defects of the magnetic tape MT obtained in the production process of the magnetic tape cartridge 10 may be applied. The information regarding the defect of the magnetic tape MT includes information indicating the position of the defect of the magnetic tape MT. In this case, in a case where data is recorded or reproduced with respect to the magnetic tape MT, the data is recorded or reproduced while avoiding a defective position.

In addition, in the embodiment, the case where two types of information ("1" and "0" in the embodiment) indicating whether or not production time information is recorded is applied as the retention flag 16, but there is no limitation thereto. As the retention flag 16, information indicating the storage destination of the production time information in a case where the production time information is recorded may be applied, in addition to the information regarding whether or not the production time information is recorded. In this case, three embodiments of applying of information such as recording the production time information on the recording medium 12, recording the production time information on the magnetic tape MT, and not recording the production time information, are exemplified as the retention flag 16.

In addition, in the embodiment, existing information may be used as the retention flag 16 and the specific information 18. In this case, an example of the retention flag 16 is the initialization flag described above. In addition, in this case, a serial number of the magnetic tape cartridge 10 is used as an example of the specific information 18.

In addition, in the above embodiment, a plurality types of information pieces may be recorded on the recording medium 12 as the production time information.

What is claimed is:

1. A recording and reproducing device comprising:
   a reading unit that reads production information from a recording medium of a magnetic tape cartridge, wherein:
      a magnetic tape and the recording medium are both inside a casing of the magnetic tape cartridge, and
      the recording medium is not tape, is separate from the magnetic tape and stores the production information, the production information being information regarding the magnetic tape obtained in a production process of the magnetic tape cartridge; and
   a control unit that performs, as an initialization process of the magnetic tape cartridge, control of recording the production information stored in the recording medium on the magnetic tape and invalidating the production information in the recording medium, the initialization process being performed at a time when the magnetic tape cartridge is initially loaded into the recording and reproducing device.

2. The recording and reproducing device according to claim 1,
   wherein the control unit performs control of removing the production information from the recording medium as the control of invalidating the production information.

3. The recording and reproducing device according to claim 1,
   wherein retention information indicating whether or not the production information is recorded is further recorded on the recording medium, and
   the control unit performs the control, in a case in which the retention information indicates that the production information is recorded on the recording medium.

4. The recording and reproducing device according to claim 1,
   wherein at least one of type information or identification information of the production information is further recorded on the recording medium, and
   the control unit performs control of associating at least one of the type information or the identification information with the production information and recording the production information on the magnetic tape.

5. The recording and reproducing device according to claim 1,
   wherein the production information is information used to control recording or reproducing of data with respect to the magnetic tape.

6. A recording and reproducing method executed by a recording and reproducing device, the method comprising:
   reading production information from a recording medium of a magnetic tape cartridge, wherein:
      a magnetic tape and the recording medium are both inside a casing of the magnetic tape cartridge, and
      the recording medium is not tape, is separate from the magnetic tape and stores the production information, the production information being information regarding the magnetic tape obtained in a production process of the magnetic tape cartridge; and
   performing an initialization process of the magnetic tape cartridge by recording the production information stored in the recording medium on the magnetic tape and invalidating the production information in the recording medium, the initialization process being performed at a time when the magnetic tape cartridge is initially loaded into the recording and reproducing device.

7. A non-transitory storage medium storing a program that causes a recording and reproducing device to perform recording and reproducing processing, the recording and reproducing processing comprising:
   reading production information from a recording medium of a magnetic tape cartridge, wherein:
      a magnetic tape and the recording medium are both inside a casing of the magnetic tape cartridge, and
      the recording medium is not tape, is separate from the magnetic tape and stores the production information, the production information being information regarding the magnetic tape obtained in a production process of the magnetic tape cartridge; and
   performing an initialization process of the magnetic tape cartridge by recording the production information stored in the recording medium on the magnetic tape and invalidating the production information in the recording medium, the initialization process being performed at a time when the magnetic tape cartridge is initially loaded into the recording and reproducing device.

8. A magnetic tape cartridge comprising:
   a magnetic tape; and
   a recording medium,
   wherein the magnetic tape and the recording medium are both inside a casing of the magnetic tape cartridge,
   wherein the recording medium is not tape, is separate from the magnetic tape and stores production information,
   wherein the production information is information regarding the magnetic tape obtained in a production process of the magnetic tape cartridge, and the production information stored in the recording medium is to be recorded on the magnetic tape and thereafter be invalidated by an initialization process of the magnetic tape cartridge, and
   wherein the initialization process is performed at a time when the magnetic tape cartridge is initially loaded into a recording and reproducing device.

9. The recording and reproducing device according to claim 1,
   wherein the production information comprises information of a distance corresponding to each of a combination of a number of a servo band and a number of a servo position.

10. The recording and reproducing device according to claim 1,
    wherein the production information comprises information regarding defects of the magnetic tape obtained in a production process of the magnetic tape cartridge.

11. The recording and reproducing device according to claim 1,
    wherein the invalidating of the production information comprises allowing the production information stored in the recording medium to be overwritten.

12. The recording and reproducing device according to claim 1,
    wherein the production information comprises information used for positioning a magnetic head of the reading unit with respect to the magnetic tape.

* * * * *